(12) United States Patent
Namima et al.

(10) Patent No.: US 12,491,772 B2
(45) Date of Patent: Dec. 9, 2025

(54) CONTROL DEVICE FOR DETERMINING AN OPERATING MODE DEFINING A NUMBER OF MOTORS OPERATING IN AN ELECTRIC VEHICLE

(71) Applicants: Hino Motors, Ltd., Tokyo (JP); TOYOTA JIDOSHA KABUSHIKI KAISHA, Toyota (JP)

(72) Inventors: Jun Namima, Hino (JP); Minoru Kowada, Hino (JP)

(73) Assignees: Hino Motors, Ltd., Tokyo (JP); Toyota Jidosha Kabushiki Kaisha, Toyota (JP)

( * ) Notice: Subject to any disclaimer, the term of this patent is extended or adjusted under 35 U.S.C. 154(b) by 124 days.

(21) Appl. No.: 17/840,042

(22) Filed: Jun. 14, 2022

(65) Prior Publication Data

US 2022/0402371 A1 Dec. 22, 2022

(30) Foreign Application Priority Data

Jun. 16, 2021 (JP) ................. 2021-100466

(51) Int. Cl.
*B60L 15/20* (2006.01)
*B60L 15/32* (2006.01)
(Continued)

(52) U.S. Cl.
CPC ............... *B60L 15/20* (2013.01); *B60L 15/32* (2013.01); *B60L 50/51* (2019.02); *H02P 21/20* (2016.02)

(58) Field of Classification Search
CPC ...... B60L 15/20; B60L 15/32; B60L 15/2054; B60L 15/2045; B60L 50/51; B60L 50/60;
(Continued)

(56) References Cited

U.S. PATENT DOCUMENTS 8,829,848 B2 * 9/2014 Kotooka ................. B60K 6/46
320/109
10,106,143 B2 * 10/2018 Ogawa ............... B60L 15/2045
(Continued)

FOREIGN PATENT DOCUMENTS

EP 3 100 926 A1 12/2016
EP 3078539 B1 * 7/2019 .......... B60L 15/2009
(Continued)

OTHER PUBLICATIONS

Extended European Search Report issued Nov. 9, 2022 in European Patent Application No. 22179245.0, 10 pages.

*Primary Examiner* — Andrew R Dyer
(74) *Attorney, Agent, or Firm* — Oblon, McClelland, Maier & Neustadt, L.L.P.

(57) ABSTRACT

An operating mode control device includes a travel driving force information acquisition unit configured to acquire a time-series travel driving force when traveling on a travel route; a vehicle speed information acquisition unit configured to acquire a time-series vehicle speed when traveling on the travel route; a motor operation estimation unit configured to estimate a time-series torque and rotation speed of the motor on the basis of a time-series travel driving force and vehicle speed; an efficiency calculation unit configured to acquire a time-series efficiency value of each operating mode on the basis of the time-series torque and rotation speed and calculate a total efficiency value; an operating mode determination unit configured to determine the operating mode having the highest total efficiency value as a default operating mode; and an operation control unit configured to control an operation by the default operating mode.

5 Claims, 6 Drawing Sheets

(51) Int. Cl.
    *B60L 50/51*           (2019.01)
    *H02P 21/20*           (2016.01)

(58) Field of Classification Search
    CPC ............. B60L 2220/42; B60L 2240/12; B60L 2240/26; B60L 2240/421; B60L 2240/423; B60L 2240/642; B60L 2240/68; B60L 2260/26; B60L 2260/50; H02P 21/20; B60W 30/18009; B60W 30/182; Y02T 10/72
    USPC .......................................................... 701/25
    See application file for complete search history.

(56) References Cited

U.S. PATENT DOCUMENTS

| | | |
|---|---|---|
| 11,021,077 B2 | 6/2021 | Oyama et al. |
| 11,565,731 B2 * | 1/2023 | Seenumani ............ B60L 58/26 |
| 11,724,717 B2 * | 8/2023 | Xu ........................ B60W 30/09 |
| | | 701/25 |
| 2015/0268053 A1 | 9/2015 | Yu et al. |
| 2016/0137185 A1 | 5/2016 | Morisaki |
| 2016/0139598 A1 * | 5/2016 | Ichikawa .............. B60W 30/09 |
| | | 701/25 |
| 2016/0152227 A1 * | 6/2016 | Tabata .................. B60W 10/06 |
| | | 903/910 |
| 2016/0257294 A1 * | 9/2016 | Morisaki ............... B60W 10/08 |
| 2016/0325728 A1 | 11/2016 | Yang et al. |
| 2018/0209634 A1 | 7/2018 | Takeuchi |
| 2018/0354368 A1 * | 12/2018 | Gotoh .................... B60K 6/365 |
| 2019/0086231 A1 * | 3/2019 | Arakawa ............. B60W 30/182 |
| 2019/0135070 A1 * | 5/2019 | Lee ........................ B60K 6/442 |
| 2019/0276002 A1 * | 9/2019 | Ito ..................... B60W 50/0097 |
| 2019/0367032 A1 * | 12/2019 | Ito ......................... B60W 50/00 |
| 2020/0122715 A1 * | 4/2020 | Layfield ................ B60L 3/0015 |
| 2020/0207328 A1 * | 7/2020 | Adachi .................. B60L 50/16 |
| 2021/0138909 A1 | 5/2021 | Tokura et al. |
| 2021/0211083 A1 * | 7/2021 | Jore ....................... B60L 50/70 |
| 2021/0237585 A1 * | 8/2021 | Miura ..................... B60L 3/104 |

FOREIGN PATENT DOCUMENTS

| | | |
|---|---|---|
| JP | 8-505 B2 | 1/1996 |
| JP | 8-33120 A | 2/1996 |
| JP | 2010-143430 A | 7/2010 |
| JP | 2010-226880 A | 10/2010 |
| JP | 2015-536128 A | 12/2015 |
| JP | 2017-081484 A | 5/2017 |
| JP | 2019-103325 A | 6/2019 |
| JP | 2020-069896 A | 5/2020 |
| JP | 2020-529351 A | 10/2020 |
| WO | 2014/053316 A2 | 4/2014 |
| WO | 2019/025183 A1 | 2/2019 |

* cited by examiner

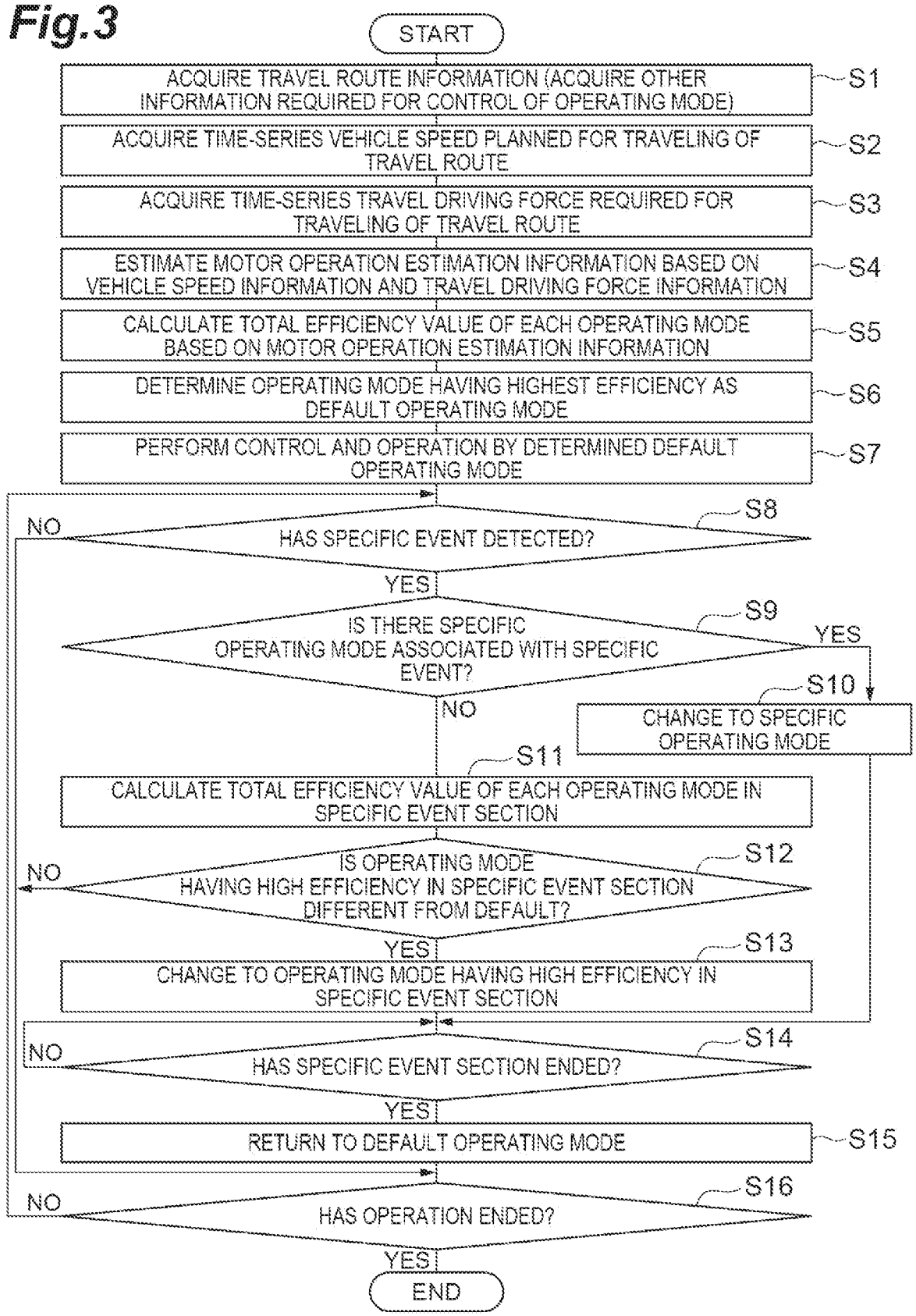

*Fig.6*

| SPECIFIC EVENT | OPERATING MODE CONTROL |
|---|---|
| RESTART FROM STOPPED STATE | – |
| UPHILL ROAD | SECOND OPERATING MODE |
| MOVEMENT FROM UPHILL ROAD TO DOWNHILL ROAD | FIRST OPERATING MODE |
| TRAVEL ROUTE CHANGE | RE-DETERMINATION |
| VEHICLE WEIGHT CHANGE | RE-DETERMINATION |
| ⋮ | ⋮ |

CONTROL DEVICE FOR DETERMINING AN OPERATING MODE DEFINING A NUMBER OF MOTORS OPERATING IN AN ELECTRIC VEHICLE

TECHNICAL FIELD

The disclosure relates to an operating mode control device which determines an operating mode in traveling of a travel route from a plurality of operating modes each defining the number of motors to be driven in an electric vehicle including a plurality of motors. This application claims the benefit of foreign priority to Japanese Patent Application No. JP2021-100466, filed Jun. 16, 2021, which is incorporated by reference in its entirety.

BACKGROUND

An electric vehicle including a battery and a plurality of motors operated by the output power of the battery is known. Further, in the vehicle driven by the plurality of motors, a control device controlling a distribution of a driving force in consideration of a heat load of the motor and stability of the vehicle is known (for example, see Japanese Unexamined Patent Publication No. 2019-103325).

The operation efficiency of the motor is different depending on a rotation speed and a torque to be generated. For example, in an example of a general motor, assuming that a combination of the torque and the rotation speed is one operation point, an efficient operation point may tend to be in a region in which the torque is medium to high and the rotation speed is medium. In an electric vehicle with a motor system including a plurality of (for example, two) motors, when a large driving force is required for traveling, the plurality of (for example, two of two) motors may be operated. However, when each motor is operated at a low rotation speed and a low load by the operation of two motors, the efficiency as the motor system may deteriorate.

SUMMARY

Here, an aspect of the disclosure is to provide an operating mode control device capable of improving fuel efficiency, electric cost, and cruising distance by improving the efficiency of a motor system in an electric vehicle with a plurality of motors.

An operating mode control device according to an aspect of the disclosure is an operating mode control device for determining an operating mode in an operation of a predetermined travel route from a plurality of operating modes each defining the number of motors to be driven in an electric vehicle including a battery and a plurality of motors, the operating mode control device including: a travel driving force information acquisition unit configured to acquire travel driving force information indicating a time-series travel driving force required for traveling on the travel route; a vehicle speed information acquisition unit configured to acquire information on a time-series vehicle speed planned for the traveling on the travel route as vehicle speed information; a motor operation estimation unit configured to estimate a time-series torque and rotation speed required for the motor when traveling on the travel route on the basis of the travel driving force information and the vehicle speed information; an efficiency calculation unit configured to acquire a time-series efficiency value when traveling on the travel route by each operating mode on the basis of motor operation estimation information which is information on the estimated time-series torque and rotation speed of the motor by referring to motor efficiency information in which the torque and the rotation speed of the motor are associated with the efficiency value of the motor and calculate a total efficiency value of each operating mode on the basis of the acquired time-series efficiency value; an operating mode determination unit configured to determine an operating mode with highest efficiency shown in the total efficiency value as a default operating mode; and an operation control unit configured to control the electric vehicle by the default operating mode.

In this operating mode control device, the time-series torque and rotation speed of the motor are estimated on the basis of the information on the predetermined time-series vehicle speed and the time-series travel driving force required in the traveling of the travel route. The time-series efficiency value of each operating mode is acquired on the basis of the estimated torque and rotation speed of the motor and the total efficiency value of each operating mode is calculated on the basis of the time-series efficiency value. Then, the operating mode having the highest total efficiency value is determined as the default operating mode. Thus, it is possible to travel on the travel route by the operating mode having higher efficiency by the operation of the motor.

Further, in the operating mode control device according to another aspect, the travel driving force information acquisition unit may be configured to calculate the travel driving force on the basis of a time-series travel resistance calculated by using at least a vehicle weight of the electric vehicle and a slope of the travel route.

According to this operating mode control device, since the travel resistance is calculated on the basis of the slope of the travel route and the vehicle weight of the electric vehicle, it is possible to acquire information on the travel driving force suitable for estimating the torque of the motor.

Further, in the operating mode control device according to another aspect, the vehicle speed information acquisition unit may be configured to acquire a legal speed associated with the travel route as the vehicle speed information, acquire the vehicle speed information by referring to travel history information obtained by accumulating information on the vehicle speed of the vehicle traveling on the travel route, or acquire the vehicle speed of the vehicle traveling on the travel route calculated on the basis of at least one of information indicating a current state of traffic volume on the travel route and information indicating a current state of a required time of the vehicle traveling on the travel route as the vehicle speed information.

According to this operating mode control device, since the information on the legal speed of the travel route, the history of the vehicle speed of the vehicle traveling on the travel route, or the current state of the vehicle traveling on the travel route is acquired, it is possible to acquire the vehicle speed information suitable for estimating the rotation speed of the motor.

Further, the operating mode control device according to another aspect further includes a specific event detection unit configured to detect a predetermined specific event during travel of the travel route, the efficiency calculation unit may be configured to calculate a specific section total efficiency value which is a time-series efficiency value in a specific event section corresponding to the specific event when detecting the specific event for each operating mode, the operating mode determination unit may be configured to determine an operating mode having the highest specific section total efficiency value as a specific event section operating mode for traveling on the specific event section, and the operation control unit may be configured to control the electric vehicle by the specific event section operating mode in the traveling of the specific event section.

According to this operating mode control device, when a predetermined specific event is detected, the operating mode having the highest total efficiency value in the traveling of the specific event section is determined as the specific event section operating mode. Thus, it is possible to travel a specific event space by the operating mode having higher efficiency in the operation of the motor.

Further, in the operating mode control device according to another aspect, the electric vehicle may include a lift axle mechanism configured to perform levitation control so that a vehicle wheel of one axle of a first axle and a second axle does not contact a ground and perform ground contact control so that a vehicle wheel of the other axle contacts a ground, the number of the motors may be two, the operating mode may include a first operating mode driven by one motor and a second operating mode driven by two motors, and the operating mode control device may further include an axle state control unit configured to perform any one of the levitation control and the ground contact control on the first axle and the second axle and perform the levitation control on any one of the first axle and the second axle when the operation control unit controls the electric vehicle by the first operating mode.

According to this operating mode control device, one of the first axle and the second axle is controlled to levitate when the control is performed by the first operating mode driven by one motor. Thus, it is possible to reduce the travel resistance and to improve fuel efficiency.

Further, in the operating mode control device according to another aspect, the axle state control unit may be configured to store at least one of the number of times and time of the levitation control and the ground contact control on each of the first axle and the second axle as control history information, and the axle state control unit may be configured to select the axle controlled to levitate from the first axle and the second axle so that a bias is reduced at the number of times or time of the ground contact control when the operation control unit controls the electric vehicle by the first operating mode.

According to this operating mode control device, since the axle controlled to levitate is selected so that a bias is reduced at the number of times or time of the ground contact control when one of the first axle and the second axle is controlled to levitate, a bias of the life of the unit consisting of each axle due to tire wear or the like during ground contact control is prevented.

Further, in the operating mode control device according to another aspect, the axle state control unit may be configured to acquire load information indicating a load of each of the first axle and the second axle, and the axle state control unit may be configured to select the axle having a small load indicated by the load information as the axle controlled to levitate from the first axle and the second axle when the operation control unit controls the electric vehicle by the first operating mode.

According to this operating mode control device, the axle having a small load of the first axle and the second axle is controlled to levitate. Accordingly, since the load distributed to both axles can be biased to one axle, it is possible to improve the traction of the axle which is in the ground contact control.

According to an aspect of the disclosure, it is possible to provide the operating mode control device capable of improving fuel efficiency, electric cost, and cruising distance by improving the efficiency of the motor system in the electric vehicle with the plurality of motors.

BRIEF DESCRIPTION OF THE DRAWINGS

FIG. 3 is a flowchart showing process contents of an operating mode control process of the operating mode control device.

FIG. 6 is a diagram showing an example of specific event detection control information in which a specific event is associated with operating mode control when detecting the specific event.

DETAILED DESCRIPTION

Figure 1:
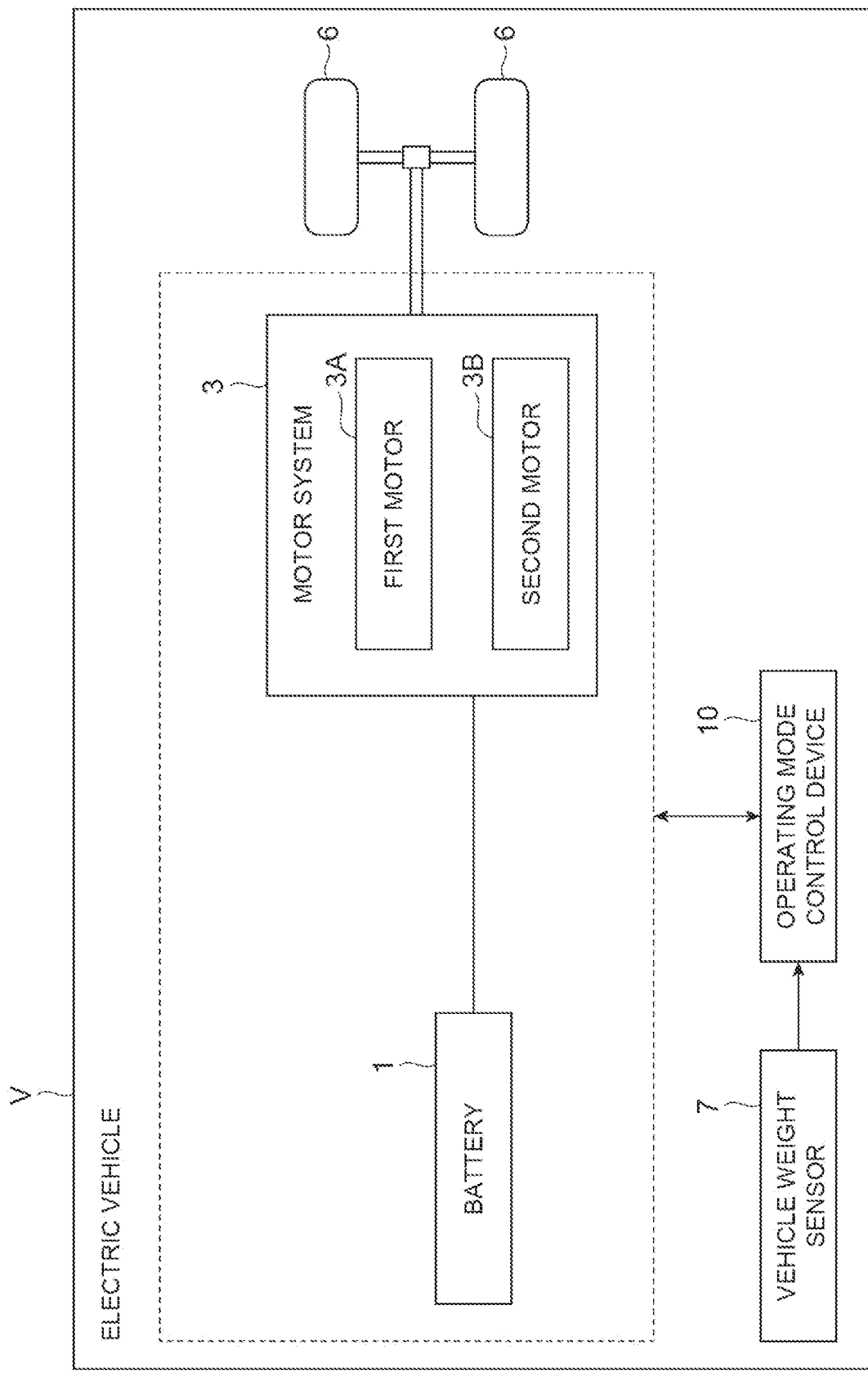
FIG. 1 is a schematic diagram showing a configuration of an electric vehicle equipped with an operating mode control device according to an embodiment of the disclosure.

Hereinafter, an embodiment according to the disclosure will be described in detail with reference to the drawings. In the following description, the same or equivalent elements are designated by the same reference numerals, and duplicate description will be omitted.

FIG. 1 is a schematic diagram showing a configuration of an electric vehicle equipped with an operating mode control device according to the embodiment. As shown in FIG. 1, an operating mode control device 10 is mounted on an electric vehicle V. The electric vehicle V includes a battery 1 and a motor system 3.

Additionally, it is assumed that an example of the electric vehicle V of this embodiment does not include a generator supplying electric power to the battery 1 and the like, but may include the generator. That is, the electric vehicle V may be an EV (Electric Vehicle) not including a generator, an FCV (Fuel Cell Vehicle) and a PHV (Plug-in Hybrid Vehicle) including a generator, or the like. When the electric vehicle V includes the generator, the generator may be a fuel cell or an engine.

The battery 1 stores electric power for driving a motor. The battery 1 may store electric power supplied from the outside. When the electric vehicle V includes the generator, the battery 1 may store electric power generated by the generator. Further, the battery 1 can also store the electric power generated by the regenerative brake or the like provided in the electric vehicle V.

The motor system 3 is operated by the output power of the battery 1. The motor system 3 allows the electric vehicle V to travel by driving vehicle wheels 6 provided in the electric vehicle V.

The motor system 3 of this embodiment includes two motors including a first motor 3A and a second motor 3B. The electric vehicle V may be driven by any one motor of the first motor 3A and the second motor 3B and may be driven by two motors of the first motor 3A and the second motor 3B.

The operating mode control device 10 is a device which determines the operating mode in the operation of a predetermined travel route from a plurality of operating modes each defining the number of motors to be driven. In this embodiment, since the motor system 3 includes two motors including the first motor 3A and the second motor 3B, the operating mode control device 10 selectively controls any operating mode of a first operating mode driven by one motor and a second operating mode driven by two motors. Additionally, it is assumed that the electric vehicle V of this embodiment includes two motors, but the number of the motors is not limited to two. That is, the operating mode control device 10 may selectively control the number of motors used for driving among three or more motors.

The electric vehicle V may further include a vehicle weight sensor 7. The vehicle weight sensor 7 is provided in each axle and detects the axle weight of each axle. The operating mode control device 10 can acquire information on the vehicle weight from the vehicle weight sensor 7. Further, the operating mode control device 10 can acquire information on the axle weight for each axle from the vehicle weight sensor 7.

Figure 2:
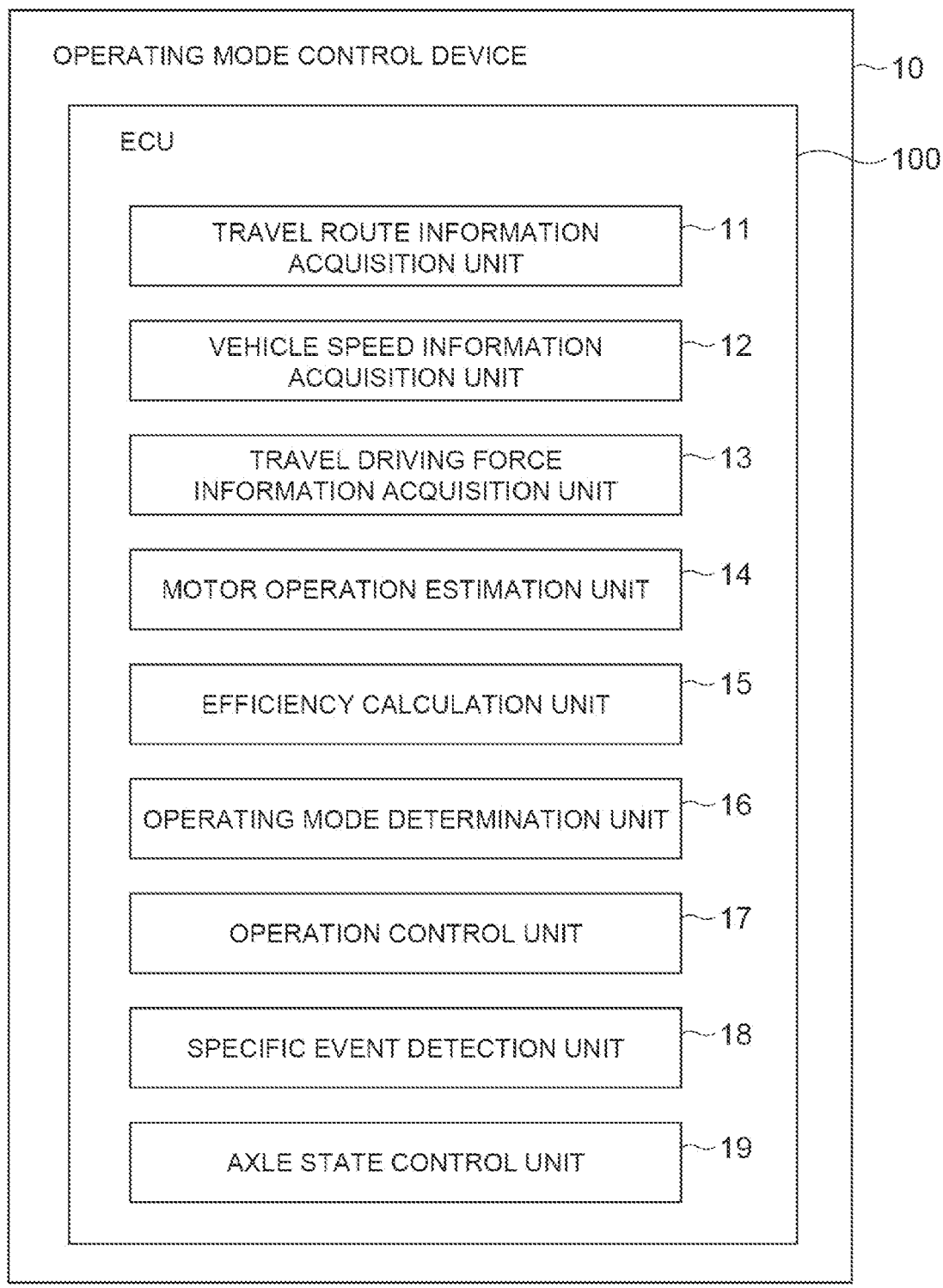
FIG. 2 is a functional block diagram showing a functional configuration of the operating mode control device.

FIG. 2 is a functional block diagram showing a functional configuration of the operating mode control device 10. The operating mode control device 10 includes an ECU (Electronic Control Unit) 100. The ECU 100 is an electronic control unit including a CPU, a ROM, a RAM, and the like. The ECU 100 realizes various functions by, for example, loading a program recorded in the ROM into the RAM and executing the program loaded in the RAM in the CPU. The ECU 100 may be composed of a plurality of electronic units.

As shown in FIG. 2, the operating mode control device 10 functionally includes a travel route information acquisition unit 11, a vehicle speed information acquisition unit 12, a travel driving force information acquisition unit 13, a motor operation estimation unit 14, an efficiency calculation unit 15, an operating mode determination unit 16, an operation control unit 17, a specific event detection unit 18, and an axle state control unit 19.

FIG. 3 is a flowchart showing process contents of an operating mode control process of the operating mode control device 10. The operating mode control process will be described with reference to FIGS. 2 and 3.

In step S1, the travel route information acquisition unit 11 acquires travel route information which is various information regarding the planned travel route. The travel route information acquisition unit 11 acquires travel route information from an external server storing the travel route information in advance or a storage device provided in the operating mode control device 10. The travel route information includes slope information indicating the slope of the travel route in addition to information indicating the position of the travel route. The slope information is used for acquiring the travel resistance as described later. The travel route information including slope information and the like may be generated on the basis of the travel history (travel resistance during travel) of the vehicle traveling on the travel route.

Figure 4A:
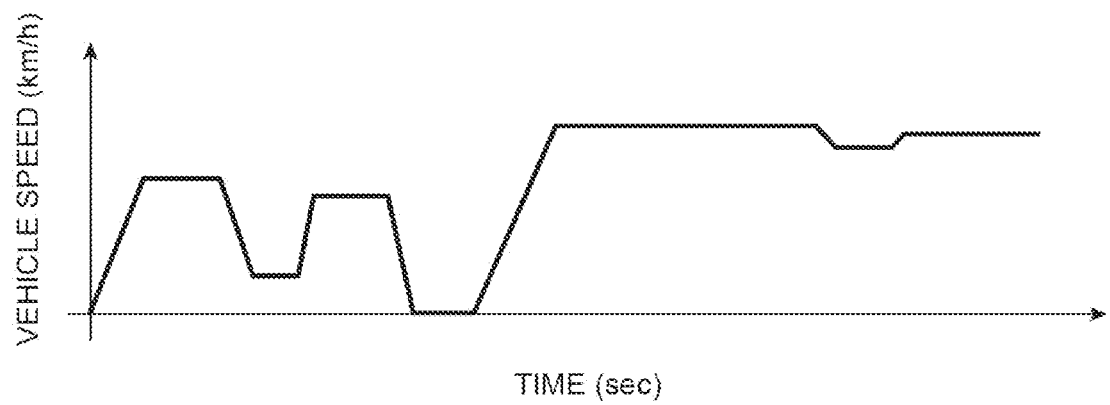
FIG. 4A is a diagram showing an example of vehicle speed information indicating a time-series vehicle speed planned for traveling on a travel route.

In step S2, the vehicle speed information acquisition unit 12 acquires information on a time-series vehicle speed planned for the traveling on the travel route from an external server or a storage device provided in the operating mode control device 10 as the vehicle speed information. The vehicle speed information is provided to estimate the rotation speed of the motors 3A and 3B. FIG. 4A is a diagram showing an example of the vehicle speed information indicating the time-series vehicle speed planned for the traveling on the travel route. The vehicle speed information acquisition unit 12 acquires information on a time-series vehicle speed having a predetermined time resolution (for example, 1 sec) as shown in FIG. 4A.

Specifically, the vehicle speed information acquisition unit 12 may acquire a legal speed associated with each section of the travel route as vehicle speed information. Further, the vehicle speed information acquisition unit 12 may acquire the vehicle speed information by referring to the travel history information in which the vehicle speed information of the vehicle traveling on the travel route is accumulated. Further, the vehicle speed information acquisition unit 12 may acquire the vehicle speed of the vehicle traveling on the travel route calculated on the basis of at least one of the information indicating the current state of traffic volume on the travel route and the information indicating the current state of the required time of the vehicle traveling on the travel route as the vehicle speed information. The information indicating the current state of the vehicle traveling on the travel route may be acquired, for example, via VICS (registered trademark).

Figure 4B:
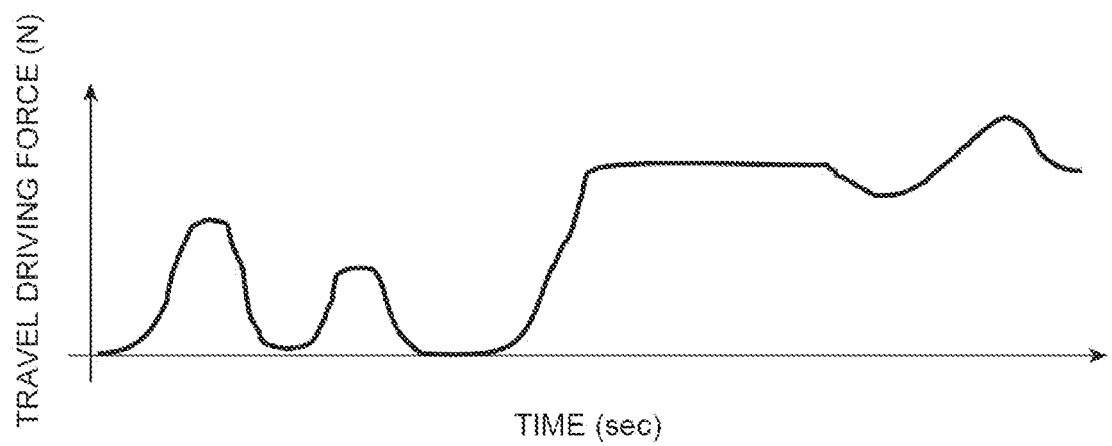
FIG. 4B is a diagram showing an example of travel driving force information indicating a time-series travel driving force required for traveling on the travel route.

In step S3, the travel driving force information acquisition unit 13 acquires travel driving force information indicating a time-series travel driving force required for the traveling on the travel route. FIG. 4B is a diagram showing an example of the travel driving force information indicating the time-series travel driving force required for the traveling on the travel route. The travel driving force information acquisition unit 13 acquires information on the time-series travel driving force having a predetermined time resolution (for example, 1 sec) as shown in FIG. 4B.

Specifically, the travel driving force information acquisition unit 13 may acquire, for example, data of the time-series travel driving force required for the electric vehicle V to travel on the travel route from a storage device storing the data of the time-series travel driving force in advance.

Further, the travel driving force information acquisition unit 13 may calculate the travel driving force on the basis of the time-series travel resistance. The travel driving force information acquisition unit 13 can calculate the travel resistance by using at least the slope of the travel route and the vehicle weight of the electric vehicle V acquired from the vehicle weight sensor 7. Since the electric vehicle V can travel at a constant speed when the travel driving force to be generated is in equilibrium with the travel resistance, the travel driving force information acquisition unit 13 can calculate the required travel driving force in time series on the basis of the time-series travel resistance based on the vehicle speed information, the vehicle weight, the rolling resistance, the air resistance, the slope of the travel route, and the like in the electric vehicle V. The travel driving force information acquisition unit 13 calculates the travel driving force by further adding the acceleration resistance component when the vehicle speed changes in acceleration. Further, the travel driving force information acquisition unit 13 calculates an excess travel resistance as a braking force or regenerative torque and regenerative energy when the vehicle speed changes in deceleration. The travel driving force information acquisition unit 13 may calculate the travel resistance and the travel driving force by an existing method.

In step S4, the motor operation estimation unit 14 estimates the time-series torque and the rotation speed required for the motors 3A and 3B when traveling on the travel route on the basis of the travel driving force information and the vehicle speed information.

Specifically, the motor operation estimation unit 14 converts the travel driving force into the torque of the motor and converts the vehicle speed into the rotation speed of the motor. When the combination of the torque and the rotation speed of the motor is defined as the operation point of the motor, the motor operation estimation unit 14 estimates the time-series operation point of the motor. By defining the information including the time-series operation point of the motor as the motor operation estimation information, the motor operation estimation unit 14 estimates the motor operation estimation information.

Additionally, the motor operation estimation unit 14 estimates the transition of the operation point on the basis of the vehicle speed information (the time-series transition of the vehicle speed) and the travel driving force information (the time-series transition of the travel driving force). However, since the transition state until a certain travel driving force and vehicle speed differs depending on the accelerator operation of the driver, the motor operation estimation unit 14 may estimate the transition of the operation point of the motor by further considering the characteristics of the accelerator operation for each driver.

Specifically, the operating mode control device 10 stores and accumulates the operation history information indicating the history of the transition of the operation point according to the accelerator operation in a predetermined storage device for each driver. The motor operation estimation unit 14 identifies the driver by a well-known method such as cooperation with a mobile terminal and face recognition and estimates the transition of the operation point of the motor based on the vehicle speed information and the travel driving force information by referring to the operation history information of a specific driver.

In step S5, the efficiency calculation unit 15 acquires a time-series efficiency value when traveling on the travel route by each operating mode on the basis of the motor operation estimation information by referring to the motor efficiency information in which the operation point consisting of the torque and the rotation speed of the motor is associated with the efficiency value of the motor.

Figure 5:
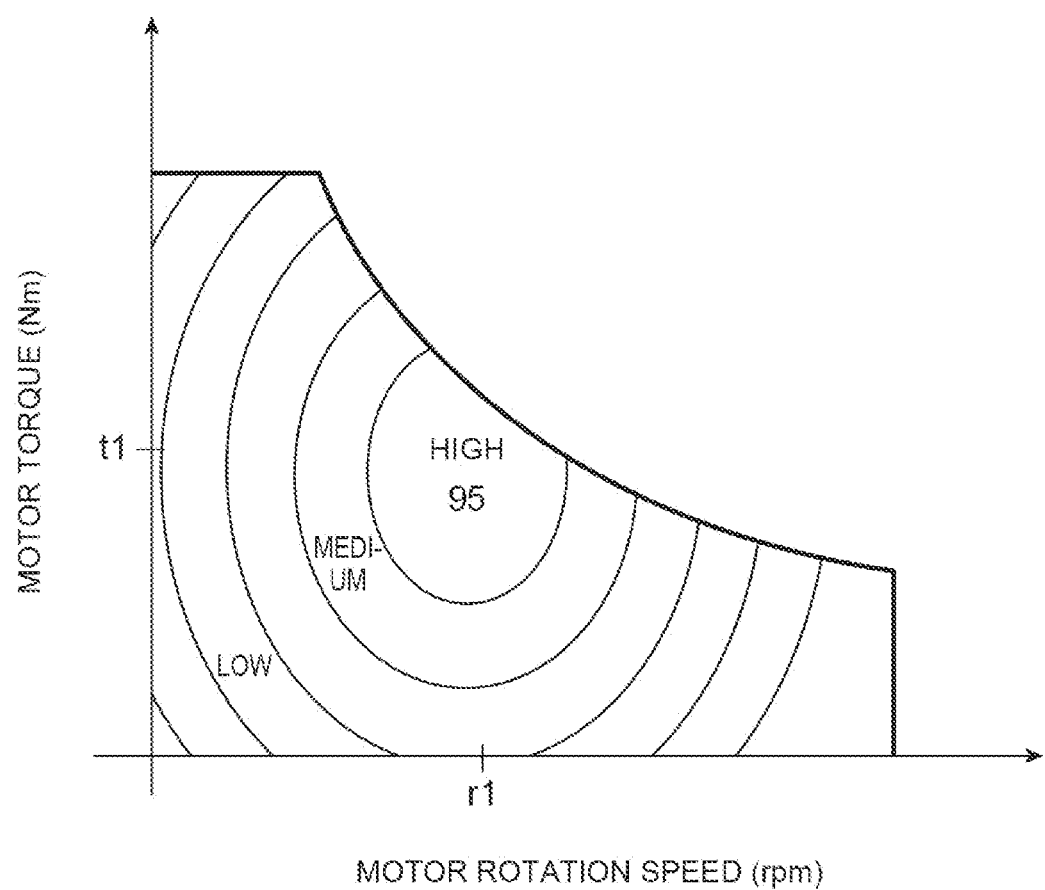
FIG. 5 is a diagram showing an example of motor efficiency information in which a motor operation point consisting of a torque and a rotation speed of a motor is associated with a motor efficiency value.

FIG. 5 is a diagram schematically showing an example of the motor efficiency information in which the operation point of the motor consisting of the rotation speed and the torque of the motor is associated with the efficiency value of the motor. The efficiency of the motor depends on the rotation speed and the torque. In the example shown in FIG. 5, for example, the efficiency value of the operation point (r1, t1) is 95%. In this way, the efficiency calculation unit 15 can uniquely acquire the efficiency value on the basis of the operation point consisting of the rotation speed and the torque by referring to the motor efficiency information.

The highly efficient point which is an operation point having high efficiency generally tends to exist in a medium rotation speed region in terms of the rotation speed and tends to exist in a medium to high torque (load) region in terms of the torque. Thus, fuel efficiency and power efficiency tend to deteriorate when the operation frequency at the operation point of a low rotation speed and a low torque is high.

In the example of the electric vehicle V of this embodiment, since the torque required for each motor is small in the second operating mode driven by two motors 3A and 3B as compared with the first operating mode driven by one motor, the efficiency tends to be low. The operating mode control device 10 of this embodiment determines and controls the operating mode in order to realize more efficient operation while satisfying the required driving force in consideration of the efficiency characteristics of such a motor.

Additionally, when the electric vehicle V includes the generator, the efficiency value associated with each operation point may be a value in consideration of the efficiency of the generator in the motor efficiency information shown in FIG. 5. For example, when the generator is composed of a fuel cell including an FC stack, the loss becomes larger as the current becomes larger in the FC stack due to the influence of concentration overvoltage and resistance overvoltage. Further, in the air compressor which is an auxiliary machine of the FC stack and occupies most of the total power consumption, the loss (consumption) power becomes larger as the output becomes larger. Thus, the FC stack shows a tendency that the efficiency is high in the low load, but since an auxiliary machine operation for controlling the state of the FC stack may be performed in an extremely low load, a high efficiency point may exist on the low load side. Further, in the motor efficiency information shown in FIG. 5, the efficiency value associated with each operation point may be a value in consideration of the magnitude of the regenerative energy efficiency.

Then, the efficiency calculation unit 15 calculates the total efficiency value of each operating mode on the basis of the time-series efficiency value acquired on the basis of the motor operation estimation information indicating the transition of the time-series operation point. Specifically, the efficiency calculation unit 15 calculates a total value of the time-series efficiency value as the total efficiency value. For example, the efficiency calculation unit 15 may calculate the total of the time-series efficiency value as the total efficiency value and may calculate the average of the time-series efficiency value as the total efficiency value.

In step S6, the operating mode determination unit 16 determines the operating mode having the highest efficiency shown in the total efficiency value as a default operating mode. In this embodiment, the operating mode determination unit 16 determines any one of the first operating mode and the second operating mode as the default operating mode.

In step S7, the operation control unit 17 controls and operates the electric vehicle V according to the default operating mode determined in step S6.

The processes of steps S1 to S7 described above are essential processes in the operating mode control method of this embodiment. The process contents after step S8 are non-essential optional processes.

In step S8, the specific event detection unit 18 determines whether or not a predetermined specific event has been detected during travel of the travel route. FIG. 6 is a diagram showing an example of specific event detection control information in which a specific event is associated with the operating mode control when detecting the specific event. The specific event detection control information is stored in, for example, an external server or a storage device provided in the operating mode control device 10. That is, in this embodiment, the specific event detection unit 18 attempts to detect the specific event included in the specific event detection control information. The specific event detection unit 18 can detect various specific events by a known method based on the acquisition of control information indicating various driving states managed by the ECU, the acquisition of position information, the matching of travel route information with position information, the reference to input information by the driver, and the like.

For example, the specific event detection unit 18 can detect the restart of the electric vehicle from the stopped state by acquiring information such as a speed change of a predetermined value or more, a magnitude of the torque change rate, and a load difference of each axle. Further, for example, the specific event detection unit 18 can detect the approach to an uphill road or a downhill road by the matching between position information acquired by a GPS device and slope data included in map information, an acceleration sensor, a gyro sensor, or the like.

Further, for example, the specific event detection unit 18 can detect an event of the changed travel route by acquiring information on a destination change input and a travel route re-search by a navigation system of the travel route. Further, for example, the specific event detection unit 18 can detect an event of the vehicle weight change by acquiring information on the vehicle weight change or the like detected by the vehicle weight sensor 7 provided in the axle.

When the specific event is detected, the process proceeds to step S9. On the other hand, when the specific event is not detected, the process proceeds to step S16.

In step S9, the specific event detection unit 18 determines whether or not a specific operating mode associated with the detected specific event exists. According to the example shown in FIG. 6, since the "second operating mode" which is a specific operating mode is associated with the specific event "uphill road" as the operating mode control when it is detected that the traveling route is an "uphill road" in step S8, the specific event detection unit 18 determines that there is a specific operating mode associated with the detected specific event. Further, since the specific operating mode is not associated with the specific event "restart from the stopped state" in the operating mode control when it is detected that the control state of the electric vehicle V is "restart from the stopped state", the specific event detection unit 18 determines that there is no specific operating mode associated with the detected specific event.

When it is determined that there is the specific operating mode associated with the detected specific event, the process proceeds to step S10. On the other hand, when it is not determined that there is the specific operating mode associated with the detected specific event, the process proceeds to step S11.

Additionally, in the example shown in FIG. 6, the operating mode control "re-determination" is associated with the specific event "travel route change" and "vehicle weight change". When the specific event detection unit 18 detects the specific event "travel route change" and "vehicle weight change", the operating mode control device 10 may perform the default operating mode determination process shown in steps S1 to S6 in the remaining travel route, control the electric vehicle V by the determined default operating mode, and perform the operation of the remaining travel route.

In step S10, the operation control unit 17 controls the electric vehicle V by the operating mode associated with the detected specific event.

In step S11, the efficiency calculation unit 15 calculates a specific section total efficiency value which is the time-series efficiency value in a specific event section which is a section of the travel route corresponding to the specific event for each operating mode. That is, the efficiency calculation unit 15 calculates the total efficiency value for each operating mode in the traveling of the specific event section by the same processes as those of steps S1 to S5 with the specific event section as the travel route.

In step S12, the operating mode determination unit 16 determines whether or not a specific event section operating mode which is an operating mode having the highest total efficiency value for the traveling in the specific event section calculated in step S11 is different from the default operating mode. When it is determined that the specific event section operating mode is different from the default operating mode, the process proceeds to step S13. On the other hand, when it is determined that the specific event section operating mode is different from the default operating mode, the process proceeds to step S16.

In step S13, the operation control unit 17 controls the electric vehicle V by the specific event section operating mode in the traveling of the specific event section. Additionally, when the specific event section operating mode is the first operating mode driven by one motor, the operating mode may be changed to the first operating mode only when the maximum travel driving force in the first operating mode satisfies the driving force required for the traveling of the specific event section.

In step S14, the specific event detection unit 18 determines whether or not the traveling of the specific event section has ended. For example, the specific event detection unit 18 can detect the end of the specific event section during start acceleration by acquiring information such as a speed change of a predetermined value or more, a magnitude of the torque change rate, and a load difference of each axle. Further, for example, the specific event detection unit 18 can detect the end of an uphill road or a downhill road by the matching between position information acquired by a GPS device and slope data included in map information, an acceleration sensor, a gyro sensor, or the like.

When it is determined that the traveling of the specific event section has ended, the process proceeds to step S15. On the other hand, when it is not determined that the traveling of the specific event section has ended, the determination process of step S14 is repeated.

In step S15, the operation control unit 17 returns from the changed operating mode to the default operating mode and controls the electric vehicle V. Additionally, in step S15, the operating mode determination unit 16 may determine the default operating mode for the remaining travel route by performing the same process as that of the default operating mode determination process shown in steps S1 to S6 on the basis of the travel route information of the remaining travel route instead of returning to the default operating mode. Then, the operation control unit 17 may control the electric vehicle V by the default operating mode determined for the remaining travel route.

In step S16, the operation control unit 17 determines whether or not the operation of the travel route has ended. When it is determined that the operation of the travel route has ended, the process ends. On the other hand, when it is not determined that the operation of the travel route has ended, the process returns to step S8.

Next, the control of the axle accompanying the control of the operating mode when the electric vehicle V includes a lift axle mechanism will be described. The lift axle mechanism is a mechanism which performs levitation control so that the vehicle wheel of one axle of a first axle and a second axle of the electric vehicle V does not contact the ground and performs ground contact control so that the vehicle wheel of the other axle contacts the ground.

The axle state control unit 19 is a functional unit which controls the first axle and the second axle for any one of levitation control and ground contact control. Specifically, the axle state control unit 19 realizes the lift axle mechanism by sending an instruction signal to an elevating control valve so that each axle levitates or contacts the ground.

The axle state control unit 19 may perform levitation control of any one of the first axle and the second axle when the operation control unit 17 controls the electric vehicle V by the first operating mode driven by one motor. In this way, when the levitation control of any one of the first axle and the second axle is performed, it is possible to reduce the travel resistance caused by the rolling resistance of the tire and to improve fuel efficiency. Further, the axle state control unit 19 may perform ground contact control of both the first axle and the second axle when the operation control unit 17 controls the electric vehicle V by the second operating mode driven by two motors.

Further, the axle state control unit 19 may store at least one of the number of times and time of levitation control and ground contact control of each of the first axle and the second axle as control history information. In such a case, the axle state control unit 19 may select the axle controlled to levitate from the first axle and the second axle so that a bias is reduced at the number of times or time of ground contact control when the operation control unit 17 controls the electric vehicle V by the first operating mode. By selecting the axles that are controlled to levitate in this way, it is possible to prevent the life of the unit composed of each axle from being biased due to tire wear or the like during ground contact control.

Further, the axle state control unit 19 may acquire the load information indicating the load of each of the first axle and the second axle from the vehicle weight sensor 7. In such a case, the axle state control unit 19 may select the axle having a small load indicated by the load information as the axle controlled to levitate in the first axle and the second axle when the operation control unit 17 controls the electric vehicle V by the first operating mode. Since it is possible to bias the load distributed to both first and second axles to one axle by selecting the axle controlled to levitate in this way, it is possible to improve the traction on the axle that is controlled to contact the ground.

As described above, in the operating mode control device 10 according to this embodiment, the time-series torque and rotation speed of the motor are estimated on the basis of the information on the predetermined time-series vehicle speed and the time-series travel driving force required for the traveling of the travel route. The time-series efficiency value of each operating mode is acquired on the basis of the estimated torque and rotation speed of the motor and the total efficiency value of each operating mode is calculated on the basis of the time-series efficiency value. Then, the operating mode having the highest total efficiency value is determined as the default operating mode. Thus, it is possible to travel on the travel route in the operating mode with higher efficiency in motor operation.

The disclosure has been described in detail above on the basis of the embodiment thereof. However, the disclosure is not limited to the above-described embodiment. The disclosure can be modified into various forms in the scope not departing from the spirit thereof.

REFERENCE SIGNS LIST

1: battery, 3: motor system, 3A, 3B: motor, 6: vehicle wheels, 7: vehicle weight sensor, 10: operating mode control device, 11: travel route information acquisition unit, 12: vehicle speed information acquisition unit, 13: travel driving force information acquisition unit, 14: motor operation estimation unit, 15: efficiency calculation unit, 16: operating mode determination unit, 17: operation control unit, 18: specific event detection unit, 19: axle state control unit, V: electric vehicle.

What is claimed is:

1. An operating mode control device for determining an operating mode in an operation of a travel route from a plurality of operating modes each defining a number of motors to be driven in an electric vehicle including a battery and a plurality of motors, the operating mode control device comprising:

circuitry configured to:
acquire travel driving force information indicating a time-series travel driving force required for traveling on the travel route;
acquire information on a time-series vehicle speed which varies with a time resolution over a time period planned for the traveling on the travel route over the time period as vehicle speed information;
estimate a time-series torque and a time-series rotation speed required for each of the motors when traveling on the travel route on a basis of the travel driving force information and the vehicle speed information;
acquire a time-series efficiency value when traveling on the travel route by each of the operating modes on the basis of motor operation estimation information which is information on the estimated time-series torque and rotation speed of each of the motors by referring to motor efficiency information including the torque and the rotation speed of the motors associated with the efficiency value of motors;
calculate a total efficiency value of each of the operating modes on the basis of the acquired time-series efficiency value;
determine an operating mode of the operating modes with highest efficiency shown in the total efficiency value as a default operating mode; and
control the electric vehicle by the default operating mode;
perform any one of levitation control and ground contact control on a first axle and a second axle and perform the levitation control on any one of the first axle and the second axle when the circuitry controls the electric vehicle by a first operating mode;
store at least one of the number of times and time of the levitation control and the ground contact control on each of the first axle and the second axle as control history information; and
select the axle controlled to levitate from the first axle and the second axle so that a bias is reduced at the number of times or time of the ground contact control when the circuitry controls the electric vehicle by the first operating mode;
wherein the electric vehicle includes a lift axle mechanism configured to perform the levitation control where a vehicle wheel of one axle of the first axle and the second axle does not contact a ground and perform the ground contact control where a vehicle wheel of the other axle contacts the ground,
wherein the number of the motors is two,
wherein the operating modes include the first operating mode driven by one motor and the second operating mode driven by two motors.

2. The operating mode control device according to claim 1,
wherein the circuitry is configured to calculate the travel driving force on the basis of a time-series travel resistance calculated by using at least a vehicle weight of the electric vehicle and a slope of the travel route.

3. The operating mode control device according to claim 1,
wherein the circuitry is configured to acquire a legal speed associated with the travel route over the time period as the vehicle speed information, acquire the vehicle speed information by referring to travel history information obtained by accumulating information on the vehicle speed of the vehicle traveling on the travel route over the time period, or acquire the vehicle speed of the vehicle traveling on the travel route calculated on the basis of at least one of information indicating a current state of traffic volume on the travel route over the time period and information indicating a current state of a required time of the vehicle traveling on the travel route as the vehicle speed information.

4. The operating mode control device according to claim 1, wherein the circuitry is further configured to:

detect a predetermined specific event during travel of the travel route, calculate a specific section total efficiency value which is a time-series efficiency value in a specific event section corresponding to the specific event when detecting the specific event for each of the operating modes, determine an operating mode of the operating modes having the highest specific section total efficiency value as a specific event section operating mode for traveling on the specific event section, and control the electric vehicle by the specific event section operating mode in the traveling of the specific event section.

5. The operating mode control device according to claim 1, wherein the circuitry is configured to:

acquire load information indicating a load of each of the first axle and the second axle; and select the axle having the load indicated by the load information as the axle controlled to levitate from the first axle and the second axle when the circuitry controls the electric vehicle by the first operating mode.

* * * * *